(12) United States Patent
Sanchez-Puebla Rodriguez (10) Patent No.: US 12,456,032 B2
(45) Date of Patent: Oct. 28, 2025

(54) IN-FLIGHT INTEGRATED MODULAR AVIONICS (IMA) RECONFIGURATION

(71) Applicant: Airbus Defence and Space SAU, Getafe (ES)

(72) Inventor: Miguel Angel Sanchez-Puebla Rodriguez, Getafe (ES)

(73) Assignee: Airbus Defence and Space SAU, Getafe (ES)

( * ) Notice: Subject to any disclaimer, the term of this patent is extended or adjusted under 35 U.S.C. 154(b) by 598 days.

(21) Appl. No.: 17/863,097

(22) Filed: Jul. 12, 2022

(65) Prior Publication Data
US 2023/0029440 A1 Jan. 26, 2023

(30) Foreign Application Priority Data

Jul. 21, 2021 (EP) ..................................... 21382660

(51) Int. Cl.
*G06N 3/04* (2023.01)
*G06F 9/50* (2006.01)
*G06F 11/30* (2006.01)
*G06F 11/34* (2006.01)

(52) U.S. Cl.
CPC ............ *G06N 3/04* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 9,027,020 B2* | 5/2015 | Edholm | ................ | G06F 9/5077 718/1 |
| 2008/0244213 A1* | 10/2008 | Flemming | ........... | G06F 11/3433 711/173 |
| 2010/0318834 A1 | 12/2010 | Planche | | |
| 2013/0086577 A1* | 4/2013 | Nakashima | .......... | H04N 21/443 717/178 |
| 2013/0138271 A1* | 5/2013 | Danielsson | ............. | H04L 69/28 701/3 |
| 2013/0227238 A1* | 8/2013 | Vijverberg | ............ | G06F 9/5077 711/170 |
| 2018/0239709 A1* | 8/2018 | Zaykov | ............... | G06F 12/0851 |

(Continued)

FOREIGN PATENT DOCUMENTS

CN 108108329 B 7/2021

OTHER PUBLICATIONS

"Real-Time Operating Systems and Component Integration Considerations in Integrated Modular Avionics Systems Report", NPL, dated: 2007, total pp. 51, retrieved from:< https://www.faa.gov/sites/faa.gov/files/aircraft/air_cert/design_approvals/air_software/AR-07-39_ROSI-IMA.pdf> (Year: 2007).*

(Continued)

*Primary Examiner* — Mustafa A Amin
(74) *Attorney, Agent, or Firm* — Greer, Burns & Crain, Ltd.

(57) ABSTRACT

A real-time computer network application in the aeronautic industry for in-flight reconfiguring of the integrated modular avionics modules onboard aircraft, via spatial and temporal partitioning of modules conforming a data processing system including a computer-implemented method for in-flight Integrated Modular Avionics reconfiguration, a data processing system for the mentioned reconfiguration, a computer program product and a computer-readable medium, both to perform such reconfiguration.

14 Claims, 3 Drawing Sheets

(56) References Cited

U.S. PATENT DOCUMENTS

2023/0111174 A1* 4/2023 Zaykov .............. G06F 9/5016
                                                    718/104
2023/0305888 A1* 9/2023 Zaykov .............. G06F 9/4887

OTHER PUBLICATIONS

"Handbook for Real-Time Operating Systems Integration and Component Integration Considerations in Integrated Modular Avionics Systems", NPL, dated: 2008, total pp. 83, retrieved from:<https://www.faa.gov/sites/faa.gov/files/aircraft/air_cert/design_approvals/air_software/AR-07-48.pdf> (Year: 2008).*

Windsor et al., "Time and Space Partitioning in Spacecraft Avionics", NPL, pp. 1-8, dated: 2009, retrieved from: https://ieeexplore.ieee.org/stamp/stamp.jsp?tp=&arnumber=5226855&tag=1 (Year: 2009).*

European Search Report; priority document, 11 pages.

U.S. Department of Transportation "DOT/FAA/AR-07/39 Real-Time Operating Systems and Component Integration Considerations in Integrated Modular Avionics Systems Report" Aug. 31, 2007; pp. 1-38.

* cited by examiner

IN-FLIGHT INTEGRATED MODULAR AVIONICS (IMA) RECONFIGURATION

CROSS-REFERENCES TO RELATED APPLICATIONS

This application claims the benefit of the European patent application No. 21382660.5 filed on Jul. 21, 2021, the entire disclosures of which are incorporated herein by way of reference.

FIELD OF THE INVENTION

The present invention belongs to the field of real-time computer systems, in particular, to the field of real-time computer network airborne systems. More specifically, the invention is of special application in the aeronautic industry for in-flight reconfiguring of the integrated modular avionics modules onboard aircraft.

The present invention provides a computer-implemented method for in-flight Integrated Modular Avionics (IMA) reconfiguration, a data processing system for the mentioned reconfiguration, a computer program product and a computer-readable medium both to perform such reconfiguration.

BACKGROUND OF THE INVENTION

Integrated Modular Avionics (IMA) are real-time computer network airborne systems that combine several computing modules to give support to different avionics applications. The IMA systems are configured as an integrated architecture of software applications that are portable across an assembly of common hardware modules.

Traditional approaches usually tend to static designs consisting of a dedicated piece of hardware for each avionics application needed depending on the aircraft purpose. Furthermore, it is common to include redundant avionics systems, with the corresponding dedicated hardware, for the critical systems in order to achieve a robust design that prevents the loss of any essential avionics function due to a software or hardware failure. These approaches cause a negative impact in the aircraft as it produces an increment in weight and size due to redundant hardware as well as the corresponding wiring needed to interconnect it.

In this sense, IMAs are considered a key technology in order to reduce the previously mentioned disadvantages, as they allow to design robust systems with redundant avionics functions but reducing considerably the amount of hardware and wiring necessary. Besides these perks, IMAs contribute as well to reduce the aircraft lifecycle cost and time to market, as it aims to standardize the avionics systems boarded within any aircraft, removing the constraints bounded to the design of each aircraft model depending on its purpose.

IMAs known in the prior art follow basically two approaches, the most common one is to mount a standardized assembly of hardware modules and to implement a fixed set of avionics functions designed specifically for a particular aircraft that is going to perform a specific type of mission. But due to the flexibility of IMAs, with a set of avionics functions portable across an assembly of common hardware resources, there is a second approach that consists in making a reconfiguration of the avionics systems to make possible for a single aircraft to perform different missions.

However, avionics systems are essential for the aircraft integrity so they need to accomplish a considerable number of safety constraints, forcing the system to verify large amounts of data. Despite the computational power of computers nowadays, that speeds up the amount of time needed to compute huge amounts of data, the data must be gathered in different parts of the system to be sent to the piece of hardware configured to compute them, increasing critically the amount of time needed to complete the process, making the reconfiguration last several minutes.

Therefore, the present invention proposes a new deterministic avionics reconfiguration paradigm that combines multicore distributed architectures with software redundancies that take advantage of spatial and temporal partitioning, and reflective memory, a high speed network for standardized flexible and efficient data dissemination. Specifically, the present system is capable of increasing the data spreading speed, allowing IMAs to dynamically reconfigure in less than a second and, therefore, being capable of achieving in-flight IMA reconfiguration.

SUMMARY OF THE INVENTION

The present invention provides a solution for the aforementioned problems, by a computer-implemented method for in-flight Integrated Modular Avionics (IMA) reconfiguration, a data processing system for in-flight IMA reconfiguration, a computer program product, and a computer-readable medium.

In a first inventive aspect, the invention provides a computer-implemented method for in-flight Integrated Modular Avionics (IMA) reconfiguration by means of spatial and temporal partitioning of modules conforming a data processing system, the method comprising the following steps:
  reading by a supervisor means of the data processing system the following data:
  indicative parameters of a plurality of partitions;
  health data stored on a common shared configuration table;
  mission type and flight phase that are being performed;
  determining by the supervisor means a plurality of criticality parameters of the plurality of partitions of the data processing system;
  determining by the supervisor means a next mode of execution of the plurality of partitions based on the previously read data and the criticality parameter;
  writing on a common shared region by the supervisor means the next mode of execution of the plurality of partitions; and
  reconfiguring the in-fight IMA modules by activating/deactivating the plurality of partitions of the data processing system based on its next mode of execution.

The present invention provides in this first inventive aspect a computer-implemented method that takes advantage of the overall architecture of an Integrated Modular Avionics (IMA) of the invention, which combines multicore distributed architectures, software avionics applications that are portable across the hardware resources conforming these architectures and a shared memory. This shared memory is specifically configured to speed up the system's information dissemination between the hardware resources to be able of reconfiguring the avionics software modules of an IMA at runtime, lasting advantageously less than a second and therefore achieving the capacity of in-flight reconfiguration.

Therefore, the present invention provides a method for in-flight IMA reconfiguration by means of spatial and temporal partitioning of modules conforming a data processing system (or system from here on), that is, the present method allows this system to reconfigure its own avionics system autonomously while the aircraft is performing a mission.

Throughout this document, "spatial and temporal partitioning" will be understood as the capacity of the data processing system to divide its available resources, i.e., cores, memory, etc., between the set of software modules that need to be executed, and the capacity to reassign the resources at runtime on demand depending on the constraints of the system.

First, supervisor means of the data processing system reads from such system a set of data defining every one of a plurality of software partitions that are executing in the data processing system, their status and the current mission that the aircraft is executing. The "supervisor means" will be understood as a piece of software or algorithm configured to read certain system data and compute them to control the system reconfiguration. The data read by the supervisor means are divided in three main groups "indicative parameters", "health status" and "mission and flight phase".

The indicative parameters of a plurality of partitions correspond to a set of data needed to define each software partition being executed in the data processing system and the resources needed to do it. Throughout this document, the term "partition" will be understood as a set of available aircraft hardware resources, i.e., cores, memory, etc., that are dedicated to the execution of a software module, more particularly, "partition" will be understood as the combination of software and hardware resources of the data processing system that are configured to behave like any of the virtual avionics functions running in an IMA at a determined instant of a mission.

The health data stored on a common shared configuration table or health status is an indicative if each partition of the system is running correctly or faulty. The "common shared configuration table" will be understood as a plurality of memory registers that are in a common shared region of the system and that are configured to store partition's related data to be shared by the data processing system.

The mission type and flight phase data are used to indicate to the data processing system which avionics applications are needed by the aircraft in a determined instant of the mission based on the tasks that are going to be performed on a particular mission and flight phase.

Once the supervisor means has read the above data, it computes such data to determine a criticality parameter of each partition of the data processing system. The criticality parameters are a plurality of values that indicate the priority order of each partition in the system. With the criticality parameters, the data processing system stablishes an order for the partitions that are going to be executed. In the case where there are not enough resources to execute them all simultaneously, the present system distributes the hardware resources among the partitions from higher to lower criticality.

In a preferred embodiment, the criticality parameter is a positive integer.

Then, the supervisor means compute the criticality parameters and the previously read data to determine the next mode of execution of every software partition to be executed. There are two possible modes of execution, "normal" or "degraded". The "normal" mode indicates that the partition is capable of executing its tasks normally, while a "degraded" mode indicates that the partition performance is not capable of performing all its avionics tasks and, hence, the aircraft has decreased its performance (degraded mode). If a partition is executing a critical task, the IMA will reconfigure to execute it in another partition.

Once the next modes of execution are determined, the supervisor means writes the modes of execution in a common region of the data processing system shared by all the software partitions that are being executed, preferably on a common shared region of the RAM memory. Every partition is allowed to read data from the common shared region, but only the supervisor means is allowed to write data in the region as well as to read data stored therein.

Finally, when the supervisor means has written every partition's next mode of execution in the common shared region, the partitions activate/deactivate themselves automatically based on the critically parameter stored in their owned portion of the common shared region in order to reconfigure the in-flight IMA modules.

Advantageously, the present method is designed to take advantage of the overall architecture of the invention and, specially, of the common shared region to speed up the process of IMA configuration, allowing an aircraft to perform in-flight IMA reconfigurations. This method improves the safety of aircraft, as they are able to recover almost immediately from any avionics failure (hardware or software) during a mission and, what is more, it makes them more flexible as the reconfiguration allows a single aircraft to change mission objectives, as it is possible to achieve an optimal configuration for the new mission avionics constraints in less than a second.

In a particular embodiment, the criticality parameter for each partition of the system is determined in step (b) by following steps:
  calculating a particular fixed polynomial based on a distributed multicore architecture of the data processing system;
  executing the polynomial by computing at least some of the indicative parameters of the partition, mission type, flight phase and data stored on the configuration table of the data processing system, and
  determining the criticality parameter by solving the polynomial.

In this particular embodiment, the criticality parameters of each partition are determined by means of a fixed polynomial.

First, a fixed polynomial is calculated for the data processing system on which it is going to be executed, based on the specific hardware resources of its distributed multicore architecture.

Once the polynomial is calculated, this polynomial is available to be executed by the supervisor means, computing at least some of the indicative parameters of the partitions, mission type, flight phase and health data stored on the configuration table to finally determine de criticality parameter.

Advantageously, in this embodiment the criticality parameters are determined more precisely due to the fixed polynomial specifically calculated for the hardware conforming the present data processing system.

In a more particular embodiment, the step of calculating a particular fixed polynomial is executed in a training phase of a 3-layer neural network, and the step of determining the criticality parameters is executed by the 3-layer neural network computing, at least, the next inputs:
  Spare resources,
  Flight phase,
  Mission profile,
  Current health status of the overall architecture.

The particular fixed polynomial that is going to be linked to the specific distributed multicore architecture conforming the data processing system is calculated in the training phase of a 3-layer neural network.

Once the fixed polynomial is calculated, the criticality parameters are determined by the 3-layer neural network by computing, at least, the data of spare hardware resources (memory and processor cores) of the data processing system, flight phase, mission profile and current health status of the overall architecture, obtaining as a deterministic output the next mode of execution for the plurality of partitions of the data processing system configured as virtual avionics modules.

This embodiment presents the advantage of calculating a more precise fixed polynomial for the particular hardware architecture of the system and, therefore, allowing more precisely to determine the criticality parameter.

In the context of the invention "overall architecture" will be understood as the data processing system including its hardware and software resources and their current configuration at a determined instant of the mission of an aircraft. There are many association levels as an aircraft comprising a plurality of avionics systems, a system comprising a plurality of equipment, and an equipment comprising a hardware and a software, wherein each of the levels has associated a health status.

In a preferred embodiment, the health status of the overall architecture is not only a binary status meaning if a particular hardware/software resource is healthy or faulted but depicted through several levels of health representing more precisely the status of the piece of hardware/software.

Therefore, the supervisor means collects all the mentioned information and reconfigures the data processing system (for all the levels of health) to be able to achieve the maximum of the objectives that appear in the mission plan.

In a second inventive aspect, the invention presents a data processing system for in-flight reconfiguration of Integrated Modular Avionics (IMA) modules by means of spatial and temporal partitioning, the data processing system comprising:
- a distributed multicore architecture comprising a plurality of hardware resources;
- a plurality of partitions configured to behave as virtual avionics hardware units, the plurality of partitions being hosted in the plurality of hardware resources of the distributed multicore architecture;
- a reflective memory configured to communicate the plurality of partitions between them;
- a supervisor means configured to monitor and control the data processing system and comprising:
- an array of indicative parameters of each partition;
- a common shared configuration table arranged to store data regarding the hardware resources of the distributed architecture and their availability;
- the aircraft function running at each partition; and
- a data input regarding the mission and flight phase;
- wherein the supervisor means are configured to perform the steps of the method according to the first inventive step.

The present invention provides in this second inventive aspect a data processing system for Integrated Modular Avionics (IMA) reconfiguration. The avionics configuration process of an IMA usually takes several minutes and needs to be done on-ground for safety, as many of the avionics functions are critical for the aircraft integrity and it's not possible to flight without them. The present data processing system is intended to be installed in aircraft and configured to optimize the process of configuration of the avionics systems needed in an aircraft for a particular mission or in a particular flight phase.

That is, the present invention provides in this second inventive aspect an improved data processing system that combines multicore distributed architectures with software avionics applications, that are portable across the common hardware resources, and a common shared memory configured as communications means intended to speed up the information spreading through the system, being capable of optimizing the configuration process in order to reduce configuration times from several minutes to less than 1 second, being capable to achieve in-flight reconfiguration.

The present data processing system is mainly formed by a distributed multicore architecture comprising a plurality of hardware resources such as microprocessors, RAM memory, ROM memory, etc.

The data processing system further comprises a plurality of partitions configured to behave as virtual avionics modules hosted in the hardware resources of the distributed multicore architecture.

The system further comprises a reflective memory configured to act as communications means between the plurality of partitions which are configured to act as virtual avionics modules. The reflective memory is configured as a shared common region of memory that can be accessed by every partition and contributes to speed up the information dissemination through the present system.

In a particular embodiment of the invention, the reflective memory is implemented using a function that executes a local and remote copy of memory blocks to copy data between its plurality of partitions, a handler function that avoid the replication of unchanged data in order to minimize the amount of data to copy, as well as a mutex (a flag to synchronize concurrent memory operations) and an FPGA (Field-Programmable Gate Array) that transmits the data over a TSN (Time Sensitive Networking), AFDX® (Avionics Full-Duplex Switched Ethernet) or Ethernet network in order to update the physical modules of reflective memory.

The data processing system further comprises a supervisor means configured to monitor and control the present system. The supervisor means or supervisor is a piece of software or algorithm that is configured to perform a closed control loop comprising reading the control data of the data processing system, performing calculations based on that data and deciding the next IMA configuration based on the previous calculations as it is defined in the first inventive aspect of the present invention.

The supervisor means comprises an array of indicative parameters for each partition, a set of data needed to define each software partition being executed in the data processing system and the resources needed to do it.

The supervisor means further comprises a common shared configuration table arranged in the common shared memory and configured as communications means to speed up the information spreading through the system, for every partition to be able to write its data on it;

Finally, the supervisor means also comprise data regarding the mission and flight phase, used to indicate to the data processing system which avionics applications are needed by the aircraft in a determined instant of the mission based on the tasks that are going to be performed on a particular mission and flight phase.

The supervisor means is configured to perform the steps of the method of the first inventive aspect and any of its particular embodiments, taking advantage of the overall architecture of the data processing system proposed in this invention.

Advantageously, the data processing system that combines a multicore distributed architecture with a plurality of partitions configured as virtual avionics hardware units portable across the common hardware resources and with the built-in reflective memory, is specifically designed to execute the method of the first inventive aspect, optimizing the process of IMA configurations to allow the present invention to achieve in-flight IMA reconfigurations in less than a second.

In a particular embodiment, at least one of the plurality of partitions is replicated to be redundant on the data processing system.

The avionics systems are critical for an aircraft, as they are configured to monitor and control some of the safety critical functions to comply with the strict constraints of the security standards. For this reason, in this particular embodiment, there is at least one partition replicated to be redundant, for example the "Flight Control" function.

Advantageously, this particular embodiment improves the robustness and security of the data processing system of the invention, as it is capable of reconfiguring its IMA modules not only to change the aircraft capacities but to replace a failing hardware/software module in less than a second, making it fail safe.

In a particular embodiment the indicative parameters of each partition are one of the following or a combination of them:
 an identifier of the partition;
 the required RAM resources to execute the partition;
 the required ROM resources to execute the partition;
 an execution frequency of the partition;
 a priority number related to the criticality level of the partition;
 a core module executing the partition;
 a mode of execution of the partition;
 a health status of the partition;
 a next state of execution;
 The plurality of partitions configured as virtual avionics modules of the invention are characterized by a tuple comprised of a combination of one or more of the indicative parameters defined below.

Firstly, the tuple of indicative parameters comprises an identifier, preferably an alphanumeric identifier, to identify unambiguously each partition. The tuple also comprises the required RAM and ROM resources needed for a particular partition to be executed on the present system. Specifically, these parameters are used by the present system to know if there are enough available resources to execute a particular partition correctly and to decide where to allocate it within the multicore distributed architecture.

Moreover, the tuple of indicative parameters also comprises the execution frequency of the partition, defining the correct frequency of the partition to perform periodically its avionics related tasks depending on the criticality and nature of the task. For example, an anti-ice or de-ice task can be executed with a frequency of 1 Hz. meanwhile a flight control system must be executed to a frequency of 250 Hz. for the aircraft to perform correctly.

The tuple of indicative parameters also comprises a static priority number that is used by the supervisor means to calculate the criticality parameter. This priority number denotes the critically level of each partition.

The tuple also comprises the core module that is executing the partition, which is necessary for the present system to know where it is allocated within the multicore distributed architecture and to control the available resources therein.

Finally, the tuple also comprises three indicative parameters intended to control the status and lifecycle of each partition which are the mode of execution, which indicates if the partition is operating in a state normal or degraded; the health status, which indicates the status of the partition that can oscillate between healthy, failed or even some intermediate states; and next state of execution, which is used by the supervisor means to start or stop the execution of a partition in the next clock cycle, being the possible states running or idle.

In a particular embodiment, the plurality of hardware resources of the distributed multicore architecture comprises Line Replaceable Units (LRUs).

In this particular embodiment, the distributed multicore architecture is comprised by Line-Replaceable Units (LRUs) which are modular components designed to be easily replaced from distributed nearby on-site inventories in order to restore systems to service the more quickly possible.

Advantageously, implementing the distributed multicore architecture of the invention with LRUs improve the robustness of the present system as they can be replaced easily and quickly if there is a failure. Furthermore, they also contribute to reduce costs and increase quality by standardizing systems development and designs across different models of vehicles, aircraft, etc.

In a particular embodiment, the reflective memory is configured as a plurality of partitions wherein each reflective memory partition is a partition of a RAM memory of the distributed multicore architecture itself.

That is, the reflective memory is configured as a plurality of RAM memory partitions configured to behave as communications means between the different modules hosted by the distributed multicore architecture of the present system.

The reflective memory does not need dedicated resources. It is implemented within the available hardware of the data processing system, as a plurality of partitions within the RAM memory of such system itself, rather than being implemented within a dedicated RAM memory. This improves the data processing system design, being easily implemented with its own resources and does it more cost effective.

Advantageously, the reflective memory improves critically the communications through different modules of the data processing system thanks to the fact that the RAM itself is one of the faster memories that can be used in a hardware system.

In a particular embodiment, each reflective memory partition of the plurality of partitions stores:
 the indicative parameters of the partition;
 a criticality parameter of the partition;
 avionics related data.

The reflective memory stores, at least, information about the indicative parameters defining the partition; a criticality parameter of the partition calculated following the steps of the method of the first inventive aspect; and the avionics related data that the data processing system needs to share in order to complete the mission objectives.

In a particular embodiment, each one of the plurality of partitions has an assigned reflective memory partition configured to be used as communications means and store the partition's data and its updated status, including a time stamp.

The reflective memory is configured as a plurality of partitions of the RAM memory, one for each partition behaving as virtual avionics modules. Each one of the plurality of partitions store the data that may be required by the different modules of the data processing system on its owned partition of reflective memory, being the data, for example, the partition relative data, avionics data and IMA configuration data. Each piece of data stored in the reflective memory is linked to an "updated status" flag, that indicates if that piece of data has been updated and a time stamp showing the instant when the piece of data was written.

Advantageously, thanks to the common shared partitions design, the timestamp and the updated flag, the present system is able to control easily the data that has been updated and it is able to minimize the quantity of data disseminated through the data processing system as it only needs to update the pieces of data with the "updated status" flag activated.

In a particular embodiment, each one of the plurality of partitions is configured to read/write data on its partition of reflective memory.

Every one of the plurality of partitions configured to behave as virtual avionics modules read and write the required data to store them in its owned portion of reflective memory, making the process quick and simple.

In a particular embodiment, the reflective memory is configured to broadcast to every partition of reflective memory the last updated data by any one of the plurality of partitions.

Each time a partition writes data into its owned portion of reflective memory, it activates its updated status flag and writes the timestamp. Acting this way, the present system knows which pieces of data needs to be replicated in all the reflective memory partitions of the RAM. Then, a common portion of reflective memory shared by all reflective memory partitions checks the updated data and replicate them to be broadcasted to the entire reflective memory of the data processing system.

Advantageously, in this embodiment the data dissemination through the present system is almost instantaneous, as takes advantage of the high speed reading/writing of the RAM memory and of the "updated" flag system that minimizes the amount of data that needs to be replicated, achieving a communications system capable to share the required data with all the data processing system modules simultaneously and almost immediately after every partition's write process.

In a preferred embodiment, the supervisor means is at least one of the plurality of partitions, the supervisor partition comprising at least the reconfiguration table stored on its reflective memory partition.

In this embodiment the supervisor means is one of the software partitions running in the data processing system, but instead of performing avionics functions, it is configured to perform the control loop over the IMA configuration. First, the supervisor partition gathers the data required to perform a new IMA configuration, including the reconfiguration table stored on its owned partition of reflective memory. Then the supervisor partition calculates the next mode of execution of every partition based on the data; and finally, the supervisor partition writes the next mode of execution in the portion of reflective memory owned by each partition, that activates/deactivates based on its new assigned state.

The supervisor partition is characterized by a tuple of indicative parameters, as well as any other partition, but it has the highest value possible of the criticality parameter so that the data processing system has the certainty that, at least, one supervisor partition is always running.

Advantageously, this embodiment allows the present system to decide quickly and autonomously the next IMA configuration based on the status of the data processing system, the mission and the flight phase.

In a particular embodiment, the reconfiguration table is configured to store:
total hardware resources of the system;
spare and available hardware resources; and
in-use hardware resources.

The reconfiguration table stores, at least, data relative to the total hardware resources of the system; and the set of spare resources, that is, the ones that are inactive waiting for the data processing system to need them due to a failure. Further, the reconfiguration table stores available resources, that is, the portion of active resources that aren't being used at the moment; and the in-use hardware resources, that is, the ones that are available but busy at the moment, executing any of the partitions configured to behave as virtual avionics modules.

In a third inventive aspect, the invention provides a computer program product comprising instructions such that, when the program is executed by a computer, cause the computer to carry out the steps of the method according to first inventive aspect.

In a fourth inventive aspect, the invention provides a computer-readable medium comprising instructions which, when run by the data processing system according the second inventive aspect, causes the computer to carry out the steps of the method according to the first inventive aspect.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention provides a computer implemented method (100) for in-flight Integrated Modular Avionics (IMA) reconfiguration by means of spatial and temporal partitioning modules and a data processing system (200) configured to execute the method (100).

The data processing system (200) comprising a distributed multicore architecture with a plurality of hardware resources (210); a plurality of partitions configured to behave as virtual avionics hardware units (220), this plurality of partitions being hosted in the plurality of hardware resources (210) of the distributed multicore architecture. The system (200) further comprises a reflective memory "RFM" (230) configured to communicate the plurality of partitions between them and a supervisor means "SM" (240) configured to monitor and control the data processing system (200). Specifically, the supervisor means (240) comprise an array of indicative parameters of each partition; a common shared configuration table (232) arranged to store data regarding the hardware resources (210) of the distributed architecture and their availability; the aircraft function running at each partition; and a data input regarding the mission and flight phase. This data processing system (200) being configured so that the supervisor means (240) perform at least the steps of the method (100) for in-flight IMA reconfiguration described below.

The method (100) for in-flight IMA reconfiguration is performed by means of spatial and temporal partitioning of modules that conform the data processing system (200) disclosed above. Specifically, the method comprises the following steps:

- reading (110) by the supervisor means (240) of the data processing system (200) indicative parameters of a plurality of partitions; health data stored on a common shared configuration table (232); and mission type and flight phase that are being performed;
- determining (120) by the supervisor means (240) a plurality of criticality parameters of the plurality of partitions of the data processing system (200);
- determining (130) by the supervisor means (240) a next mode of execution of the plurality of partitions based on the previously read data and the criticality parameter;
- writing (140) on a common shared region by the supervisor means (240) the next mode of execution of the plurality of partitions; and
- reconfiguring (150) in-fight the IMA modules by activating/deactivating the plurality of partitions of the data processing system (200) based on its next mode of execution.

Figure 1A:
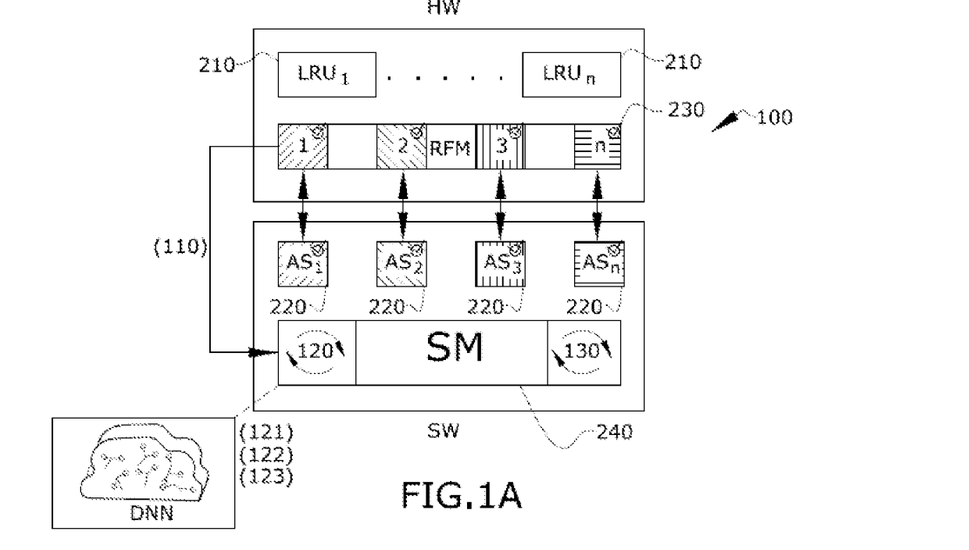
FIGS. 1A, 1B show a flow chart of the method for in-flight Integrated Modular Avionics (IMA) reconfiguration according to an embodiment of the present invention.
Figure 1B:
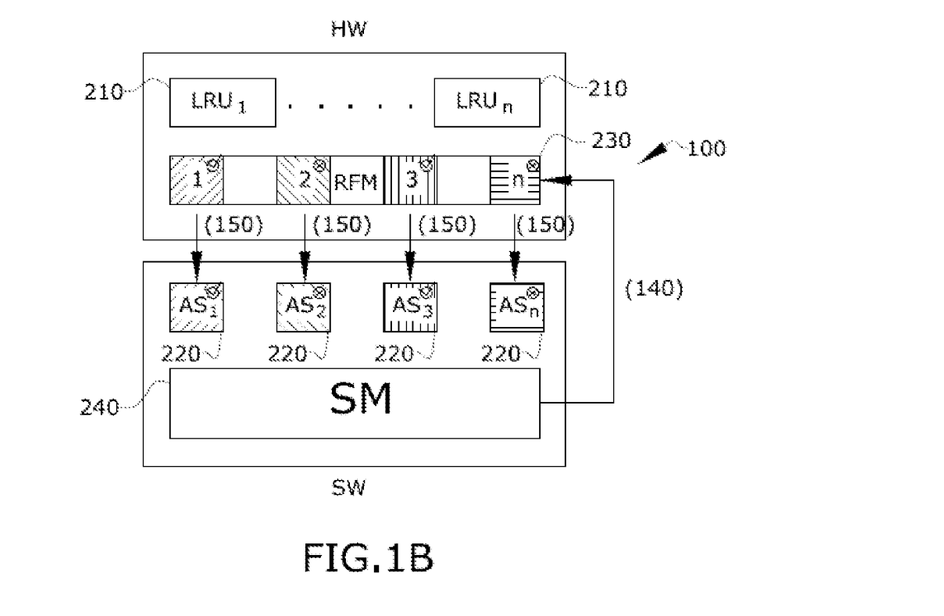

FIGS. 1A and 1B depict the steps followed by the data processing system (200) when executes the method (100) for a simplified particular example of IMA reconfiguration process during an in-flight mission. In this particular example, the running software partitions that behave like virtual avionics systems (220) are represented by a check mark, while the stopped ones are represented by a cross.

FIG. 1A shows the initial aircraft IMA configuration during the execution of the steps (a)-(c) of the method (100), that comprises four software partitions that behave like virtual avionics systems "AS1, AS2, AS3 and ASn" (220) and that are running in the data processing system (200) of the invention. In this particular example, the plurality of resources (210) forming the data processing system (200) is a plurality of Line Replaceable Units "LRU1, . . . LRUn" (210), an easily replaceable modular hardware component, each one comprising a plurality of CPUs (211) or cores, a Hard Disk Drive "HDD" (213), and a RAM (212) memory with a portion configured to behave as a reflective memory (230). This reflective memory (230) is in charge to communicate the plurality of partitions between them. For a better understanding of the scheme, every virtual avionics system (220) and its related portion of reflective memory (230) are depicted with the same striped pattern.

First, according to step (a) of the method (100), the supervisor means "SM" (240) reads (110) a set of data defining the current status of the data processing system (200), that is, the status of the plurality of partitions behaving like virtual avionics systems "AS1, AS2, AS3, ASn" (220) and of the LRUs' (210) hardware, represented by three main groups of data: the "indicative parameters" that define each software partition; the "health status" data, that indicate the status of the partitions; and the "mission and flight phase" defining the aircraft avionics systems (220) needed in this particular phase of the mission. This set of data are monitored in a closed loop by the supervisor means (240), that reads them from the shared common memory (230) during the whole mission, in order to determine the set of IMA modules needed along the mission.

Once the supervisor means (240) has read the data previously mentioned, it determines (120) in step (b) a criticality parameter for each of the plurality of virtual avionics systems (220) running on the data processing system (200). This criticality parameter indicates the relevance of each one of the avionics systems (220) in the current phase of the aircraft mission and it is used to rank them in order of priority. If in a certain phase of the mission there is not enough hardware resources for all the avionics systems (220) needed, the avionics systems (220) would be allocated in the available hardware resources from highest to lowest priority.

In this particular example, the criticality parameters of each one of the plurality of partitions (or avionics systems) (220) are determined by supervisor means (240) by calculating (121) in the training phase of a 3-layer Deep Neural Network "DNN" a particular fixed polynomial based on the hardware resources of the distributed multicore architecture formed by the LRUs (210). Then the SM (240) executes (122) the polynomial by computing some of the indicative parameters, mission type, flight phase and data stored on the common shared configuration table (232) of the data processing system (200) and determines (123) the criticality parameters by solving the polynomial.

Based on the set of data read in step (a) (110) and on the criticality parameter determined in step (b) (120-123) the supervisor means "SM" (240) determines (130) the next mode of execution of the plurality of partitions (220).

FIG. 1B shows the final aircraft IMA configuration during the steps (d)-(e) of the method (100), that consists of two running (AS1, AS3) software partitions and two stopped (AS2, ASn) software partitions that behave like virtual avionics systems (220).

Once the supervisor means (240) has performed the steps (a)-(c) of method (100) depicted in FIG. 1A (110, 120, 121, 122, 123 and 130), it writes (140) according to step (d) in a common shared region (230) of the data processing system (200) the next mode of execution of the plurality of partitions "AS1, AS2, AS3, ASn" (220). In this particular example, the common shared region is a reflective memory (230) configured as communication means in the data processing system (200) and it is used to speed up the spreading of data through the data processing system (200).

Finally, when the next mode of execution has been written (140) in step (d) by the supervisor means (240), every software partition behaving like a virtual avionics system (220) reads its particular next mode of execution and activates/deactivates autonomously, causing the in-flight reconfiguration (150) of the aircraft IMA modules.

Figure 2:
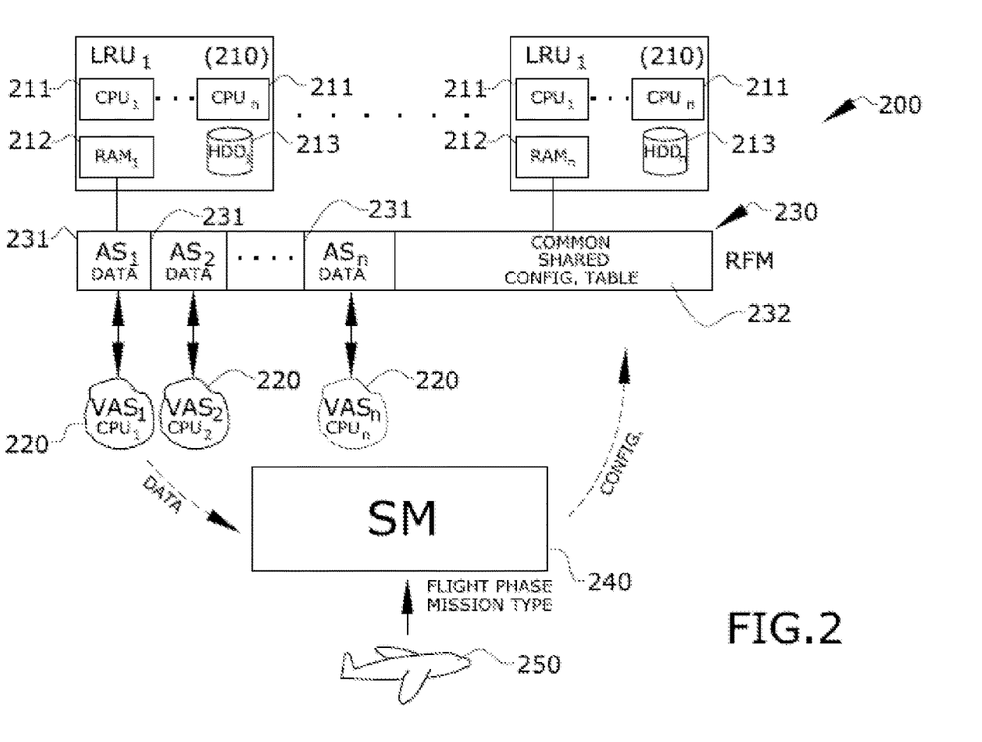
FIG. 2 shows a simplified hardware architecture of the in-flight IMA reconfiguration data processing system according to an embodiment of the present invention.

FIG. 2 depicts a particular example of a simplified architecture of the data processing system (200) of the invention that is configured to perform the steps of the method (100) showed in FIGS. 1A and 1B.

The data processing system (200) of the example showed in FIG. 2 is formed by a distributed multicore architecture comprising a plurality of resources (210). The plurality of resources (210) are a plurality of Line Replaceable Units "LRUs", modular hardware components designed to be easily replaced and commonly used in aircraft systems.

Each one of the LRUs of the example are comprised of a plurality of cards, each comprised of a plurality of Central Processing Units "CPUs" (211), commonly comprised of a plurality of cores, which are the modules in charge of executing the virtual avionics systems (220); Random Access Memory "RAM" (212), which are the hardware modules of fast memory that, among other uses, are configured as a reflective memory (230) of the data processing system (200); and Hard Disk Drives "HDDs" (213), which are the hardware modules configured to provide persistent data storage to the data processing system (200) of the invention. For the sake of simplicity, the LRUs depicted in FIG. 2 are comprised only of a card with a plurality of CPUs (cores not represented), a RAM module and an HDD.

The data processing system (200) of the example also comprises a plurality of partitions (220) configured to behave as virtual avionics systems (VAS). These virtual avionics modules are distributed between the plurality of hardware resources (210) that are available on the LRUs and can be activated/deactivated by the data processing system (200) in order to achieve in-flight IMA reconfiguration. Moreover, some of the plurality of partitions (220) can be redundant if the virtual avionics system that is being executed therein is critical for the operation of the aircraft (250), improving the robustness of the data processing system (200) of the invention.

The data processing system (200) furthermore comprises a reflective memory (230) configured to communicate the plurality of partitions (220). In this particular example, the reflective memory (230) is implemented within the RAM memory (212) of the LRUs of the plurality of hardware resources (210). From a physical point of view, each core may own a plurality of shared memory (reflective memory in this particular example) partitions and every partition is replicated in each core. The reflective memory is used to improve the communications speed and making the data processing system (200) design simpler and more cost effective.

The reflective memory (230) comprises a partition (231) of RAM memory for each virtual avionics system (220), which stores its particular data, like its indicative parameters, its criticality parameter and its avionics related data; and a common shared configuration table (232), which stores data about the total hardware resources (210) of the data processing system (200), the spare and available hardware resources and the in-use hardware resources.

Finally, the data processing system (200) depicted in FIG. 2 comprises a supervisor means (240) configured to monitor and control the data processing system (200) in a closed loop. In this particular example, the supervisor means (240) is one of the plurality of partitions and, for the sake of simplicity, it has not been replicated although it is the more critic software partition in the data processing system (200).

The supervisor means (240) reads (110) the system data as described in the method (100) showed in FIGS. 1A and 1B. In this particular example, the supervisor means (240) reads an array of indicative parameters of each partition stored in each reflective memory (230) partition (231), data from the common shared configuration table (232) and data inputs regarding the mission and flight phase from the aircraft (250).

Finally, the supervisor means (240) computes the read data and writes (140) the next mode of execution on the reflective memory (230) in order to achieve in-flight IMA reconfiguration for the mission and flight phase currently being performed by the aircraft (250).

Figure 3:
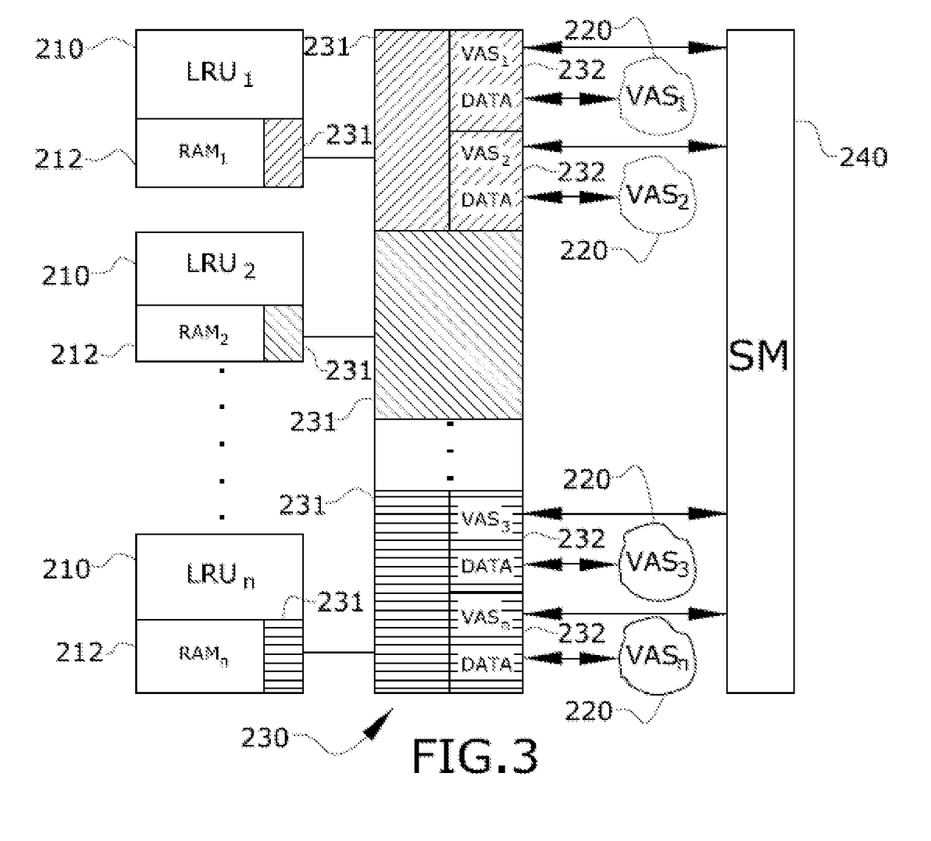
FIG. 3 shows a configuration of a reflective memory of the data processing system according to an embodiment of the present invention.

FIG. 3 shows an illustrative example of a simplified configuration of the reflective memory (230) of the data processing system (200) of the invention.

The data processing system (200) of the example is comprised of a plurality of Line Replaceable Units (210), which are comprised of several hardware resources (CPUs, RAM, HDD, etc.) as already described above.

The FIG. 3 depicts a reflective memory (230) that is implemented by a plurality of partitions (231) of the distributed RAM (212) of the data processing system (200), that is, it is formed by a plurality of portions of the RAM (212) of each one of the LRUs (210) forming the distributed multicore architecture of the data processing system (200). The reflective memory (230) stores, among others that are not illustrated for the sake of simplicity, the data (232) of every one of the plurality of partitions that behave like virtual avionics systems (220). Each RAM partition (231) is depicted as a reflective memory (230) portion with the same striped pattern for a better understanding of the scheme.

In this illustrative example, every virtual avionics system (220) is configured to read/write only from the portion of reflective memory (230) where its data (232) is stored, but the supervisor means (240) can read/write in every portion of reflective memory (230).

The reflective memory (230) is configured as communications means to speed up the data spreading through the data processing system (200). In a particular example, every piece of data stored in the reflective memory (230) is related to an "updated status" flag that indicates if a particular piece of data has been changed and must be broadcasted to be updated in the data processing system (200). This mechanism is aimed to reduce the communications times between virtual avionics systems (220) to less than a second in order to achieve in-flight IMA reconfiguration.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method for in-flight Integrated Modular Avionics (IMA) reconfiguration by means of spatial and temporal partitioning of IMA modules conforming a data processing system, the computer-implemented method comprising the following steps:
   (a) reading by a supervisor means of the data processing system data including:
      indicative parameters of a plurality of partitions;
      health data stored on a common shared configuration table; and
      mission type and flight phase that are being performed;
   (b) determining by the supervisor means a plurality of criticality parameters of the plurality of partitions of the data processing system, the plurality of criticality parameters including an execution order of the plurality of partitions based on a priority of execution;

(c) determining by the supervisor means a next mode of execution of the plurality of partitions based on previously read data and the plurality of criticality parameters;

(d) writing on a common shared region by the supervisor means the next mode of execution of the plurality of partitions; and (e) reconfiguring in-fight the IMA modules by activating or deactivating the plurality of partitions of the data processing system based on the next mode of execution of the data processing system, wherein a criticality parameter for each partition of the data processing system is determined in step (b) by following steps:

calculating a particular fixed polynomial based on a distributed multicore architecture of the data processing system;

executing said particular fixed polynomial by computing at least some of the indicative parameters of a partition, mission type, flight phase and data stored on the common shared configuration table of the data processing system, and determining the criticality parameter by solving said polynomial.

2. The computer-implemented method according to claim 1, wherein the step of calculating a particular fixed polynomial is executed in a training phase of a 3-layer neural network, and the step of determining the criticality parameters is executed by the 3-layer neural network computing, at least, next inputs:

spare resources,
flight phase,
mission profile,
current health status of an overall architecture.

3. A data processing system for in-flight reconfiguration of Integrated Modular Avionics modules with spatial and temporal partitioning, the data processing system comprising:

a distributed multicore architecture comprising a plurality of hardware resources;

a plurality of partitions configured to behave as virtual avionics hardware units, the plurality of partitions being hosted in the plurality of hardware resources of the distributed multicore architecture;

a reflective memory configured to communicate the plurality of partitions between them;

a supervisor means configured to monitor and control the data processing system and comprising:

an array of indicative parameters of each partition;

a common shared configuration table arranged to store data regarding the hardware resources of the distributed architecture and their availability;

an aircraft function running at each partition; and a data input regarding a mission phase and a flight phase;

wherein the supervisor means are configured to perform the steps of the computer-implemented method according to claim 1.

4. The data processing system according to claim 3, wherein at least one of the plurality of partitions is replicated to be redundant on the data processing system.

5. The data processing system according to claim 3, wherein the indicative parameters of each partition are one of the following or a combination of them:

an identifier of the partition;
RAM resources required to execute the partition;
ROM resources required to execute the partition;
an execution frequency of the partition;
a priority number related to a criticality level of the partition;
a core module executing the partition;
a mode of execution of the partition;
a health status of the partition; or
a next state of execution.

6. The data processing system according to claim 3, wherein the plurality of hardware resources of the distributed multicore architecture comprises Line Replaceable Units.

7. The data processing system according to claim 3, wherein the reflective memory is configured as a plurality of partitions, wherein each reflective memory partition is a partition of a RAM memory of the distributed multicore architecture itself.

8. The data processing system according to claim 7, wherein each reflective memory partition of the plurality of partitions stores at least:

the indicative parameters of the partition;
a criticality parameter of the partition; or
avionics related data.

9. The data processing system according to claim 7, wherein each one of the plurality of partitions has an assigned reflective memory partition configured to be used as communications means and to store data of said partition and an updated status of said partition, including a time stamp.

10. The data processing system according to claim 7, wherein the reflective memory is configured to broadcast to every partition of reflective memory, a last updated data by any one of the plurality of partitions.

11. The data processing system according to claim 7, wherein the supervisor means is at least one of the plurality of partitions, referred to as a supervisor partition, said supervisor partition comprising at least the common shared configuration table stored on its reflective memory partition.

12. The data processing system according to claim 3, wherein the common shared configuration table is configured to store:

total hardware resources of the data processing system;
spare and available hardware resources; and
in-use hardware resources.

13. A non-transitory computer readable medium comprising instructions such that, when the instructions are executed by a processor of a computer, cause the computer to carry out the steps of the computer-implemented method according to claim 1.

14. A non-transitory computer-readable medium comprising instructions which, when run by a data processing system, via execution by a processor, for in-flight reconfiguration of Integrated Modular Avionics modules by means of spatial and temporal partitioning, the data processing system comprising:

a distributed multicore architecture comprising a plurality of hardware resources;

a plurality of partitions configured to behave as virtual avionics hardware units, the plurality of partitions being hosted in the plurality of hardware resources of the distributed multicore architecture;

a reflective memory configured to communicate the plurality of partitions between them;

a supervisor means configured to monitor and control the data processing system and comprising:

an array of indicative parameters of each partition;

a common shared configuration table arranged to store data regarding the hardware resources of the distributed architecture and their availability;

an aircraft function running at each partition; and a data input regarding the mission and flight phase, causes the data processing system to carry out the steps of the computer-implemented method according to claim 1.

\* \* \* \* \*